US007278157B2

(12) United States Patent
Jones et al.

(10) Patent No.: US 7,278,157 B2
(45) Date of Patent: Oct. 2, 2007

(54) EFFICIENT TRANSMISSION OF IP DATA USING MULTICHANNEL SOCKS SERVER PROXY

(75) Inventors: Douglas L. Jones, Raleigh, NC (US); William C. Wimer, II, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 10/097,950

(22) Filed: Mar. 14, 2002

(65) Prior Publication Data

US 2003/0177384 A1   Sep. 18, 2003

(51) Int. Cl.
*H04L 29/06*   (2006.01)
*H04K 1/00*   (2006.01)

(52) U.S. Cl. ............... 726/12; 726/3; 726/14; 726/15

(58) Field of Classification Search ........ 709/227, 709/230; 726/1–34
See application file for complete search history.

(56) References Cited

U.S. PATENT DOCUMENTS

| | | | | |
|---|---|---|---|---|
| 5,365,577 A * | 11/1994 | Davis et al. | ............ | 379/93.17 |
| 5,379,278 A * | 1/1995 | Safadi | ............ | 370/221 |
| 5,623,601 A * | 4/1997 | Vu | ............ | 713/201 |
| 5,805,803 A * | 9/1998 | Birrell et al. | ............ | 713/201 |
| 6,092,117 A * | 7/2000 | Gladwin et al. | ............ | 709/239 |
| 6,104,716 A * | 8/2000 | Crichton et al. | ............ | 370/401 |
| 6,182,141 B1 * | 1/2001 | Blum et al. | ............ | 709/227 |
| 6,195,366 B1 * | 2/2001 | Kayashima et al. | ........ | 370/475 |
| 6,226,684 B1 * | 5/2001 | Sung et al. | ............ | 709/238 |
| 6,661,799 B1 * | 12/2003 | Molitor | ............ | 370/401 |
| 2002/0038371 A1 * | 3/2002 | Spacey | ............ | 709/227 |
| 2002/0133723 A1 * | 9/2002 | Tait | ............ | 713/201 |
| 2002/0147927 A1 * | 10/2002 | Tait | ............ | 713/201 |

OTHER PUBLICATIONS

NEC About SOCKS, <http://web.archive.org/web/20010204052600/www.socks.nec.com/aboutsocks.html>, (Feb. 4, 2001).*
NEC SOCKS Version 5 <http://web.archive.org/web/20001216082700/www.socks.nec.com/socksv5.html>, (Feb. 4, 2001).*

(Continued)

*Primary Examiner*—Gilberto Barrón, Jr.
*Assistant Examiner*—Thomas Szymanski
(74) *Attorney, Agent, or Firm*—Jeanin Ray-Yarletts, Esq.; Steven M. Greenberg, Esq.; Carey Rodriguez Greenburg & Paul LLP

(57) ABSTRACT

In a data communications network, a split proxy can include a split proxy server disposed behind a firewall in a private portion of the data communications network; a split proxy client disposed in a client computing device positioned externally to the private portion of the data communications network; a split proxy client interface to at least one client application in the client computing device, and a split proxy server interface to at least one server application corresponding to the at least one client application in the private portion of the data communications network. A tunnel can be established between the split proxy client and split proxy server. The tunnel can host all Internet Protocol (IP) data traffic between the client application and the corresponding server application in the private portion of the data communications network.

16 Claims, 2 Drawing Sheets

OTHER PUBLICATIONS

Socks—A Whatis Definition, <http://whatis.techtarget.com/definition/o,,sid9_gci213023,00.html> (Feb. 25, 2002).*

*Socks—A Whatis Definition*, <http://whatis.techtarget.com/definition/O,,sid9_gci213023,00.html>, (Feb. 25, 2002).

*SOCKS Overview, About SOCKS*, <http://www.socks.nec.com/aboutsocks.html>, (Feb. 25, 2002).

*Why SOCKS?, About SOCKS*, <http://www.socks.nec.com/whysocks.html>, (Feb. 25, 2001).

* cited by examiner

EFFICIENT TRANSMISSION OF IP DATA USING MULTICHANNEL SOCKS SERVER PROXY

BACKGROUND OF THE INVENTION

1. Statement of the Technical Field

The present invention relates to the field of network communications and more particularly to a multichannel SOCKS server configuration.

2. Description of the Related Art

Internet security increasingly has become the focus of information technology professionals who participate in globally accessible computer networks. In particular, with the availability and affordability of broadband Internet access, many computers in the corporate Intranet now enjoy high-speed access to services on the Internet. Notwithstanding, continuous, high-speed access is not without its price. Specifically, those computers and computer networks which heretofore had remained disconnected from the security risks of the Internet now have become the primary target of malicious Internet hackers, crackers and script kiddies, collectively referred to as "malicious hackers".

In response to the risks of global network connectivity, several solutions have been developed which inherently restrict unfettered access between computing devices in the corporate Intranet, and computing devices in the global Internet. For instance, proxy servers have been positioned with the corporate Intranet where the proxy servers can limit data communications connectivity between external HTTP-based content providers and local Web clients. Other proxy type solutions include other types of data transfer protocols, such as FTP, telnet, and the like. For example, the SOCKS proxy protocol can be applied not only to HTTP-based content providers, but to other data transfer protocols such as FTP.

SOCKS is an Internet Engineering Task Force (IETF) standard for a generic proxy protocol for TCP/IP based networking applications. As SOCKS has been defined in RFC 1928, the SOCKS protocol provides for a flexible framework for developing secure communications by easily integrating other security technologies. Notably, SOCKS includes two components: the SOCKS server and the SOCKS client. The SOCKS server is implemented at the application layer, while the SOCKS client is implemented between the application and transport layers. The basic purpose of the SOCKS protocol is to enable hosts on one side of the SOCKS server to gain access to hosts on the other side of the SOCKS server without requiring direct IP-reachability.

In operation, when an application client requires connectivity to an application server, the application client first can connect to a SOCKS proxy server. The proxy server subsequently can connect to the application server on behalf of the application client, and can relay data between the application client and the application server. As will be apparent to one skilled in the art, in a conventional SOCKS proxy implementation, the SOCKS server appears to the application server as the application client.

Because of its simplicity and flexibility, SOCKS has been used as a network firewall, generic application proxy, in virtual private networks, and in extranet applications. Notably advantages of a SOCKS proxy implementation include transparent network access across multiple proxy servers, easy deployment of authentication and encryption methods, rapid deployment of new network applications and simple network security policy management. Yet, the conventional SOCKS proxy implementation cannot provide a comprehensive solution to address all enterprise computing communications topologies.

For example, while the conventional SOCKS proxy implementation addresses the need for a client computing device within the Intranet to access computing devices in the global Internet, the conventional SOCKS proxy likewise does not handle the inverse situation where an external client in the Internet requires access to computing resources within the Intranet. However, the advent of pervasive computing and the near-ubiquity of mobile computing devices has given rise to an entirely new set of data connectivity needs. In particular, not only must pervasive computing devices have secure, authorized access to Intranet computing resources, but also the computing resources must smoothly handle unique communications issues associated with pervasive computing, including roaming and bandwidth limitations.

SUMMARY OF THE INVENTION

The present invention is a multichannel split SOCKS proxy server configured to smoothly handle the unique communications issues associated with pervasive computing, including roaming and bandwidth limitations. In particular, the multichannel split SOCKS proxy server configuration can reduce traffic flow between an Internet based client and computing resources within the Intranet. Furthermore, the multichannel split SOCKS proxy server configuration can enable seamless roaming between networks designed to support pervasive devices, such as GPRS and WiFi (802.11(b)) without risking the loss of the underlying data communications link between the Internet based client and computing resources within the Intranet. Finally, the multichannel split SOCKS proxy server configuration can support HTTP-based communications.

In a data communications network, a multichannel split proxy server can include a split proxy server disposed behind a firewall in a private portion of the data communications network; a split proxy client disposed in a client computing device positioned externally to the private portion of the data communications network; a split proxy client interface to at least one client application in the client computing device, and a split proxy server interface to at least one server application corresponding to the at least one client application in the private portion of the data communications network. A tunnel can be established between the split proxy client and split proxy server. The tunnel can host all Internet Protocol (IP) data traffic between the client application and the corresponding server application in the private portion of the data communications network.

The split proxy server can include a split SOCKS server and the split proxy client can include a split SOCKS client. Alternatively, the split proxy server can include a split HTTP proxy server and the split proxy client can include a split HTTP proxy client. Notably, each of the split proxy client and split proxy server can include link re-establishment logic configured to re-establish a link forming the tunnel responsive to a termination of the link. Also, the tunnel can include an authenticated tunnel. Finally, each of the split proxy client and split proxy server can include a data compressor/decompressor configured to compress all IP data flowing through the tunnel and to decompress all IP data emerging from the tunnel. Notably, in a preferred aspect of the invention, the tunnel can include one or more multiplexed sub-channels, each sub-channel hosting all IP data traffic between a single one of the client applications and a corresponding one of the server applications.

A method for processing secure data communications between server applications disposed in a private portion of a data communications network, and socksified client applications hosted in a client computing device in a portion of the data communications network which is external to the private portion, can include programming a firewall in the private portion of the data communications network to disallow communicative links between the server application and computing devices which are external to the private portion of the data communications network. In the client computing device, a client application can be socksified. Likewise, the client computing device can be configured to host a split SOCKS client.

A communicative link can be established between the split SOCKS client in the client computing device, and the split SOCKS server disposed in the private portion of the data communications network. In consequence, the communicative link can form an authenticated tunnel. Moreover, a sub-channel can be established over the authenticated tunnel for each pair of client applications and server applications, wherein application data associated with each pair can be passed through the authenticated tunnel over the sub-channel.

In a preferred aspect of the invention, an authentication credential can be inspected for each additional client application requesting a connection through the split SOCKS server with a corresponding server application. In consequence, if the inspected authentication credential compares to an authentication credential already inspected when establishing one of the authenticated tunnel and the sub-channels, a new sub-channel can be established for the additional client application and corresponding server application without forwarding the credential to the split SOCKS server.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a multichannel split SOCKS server. In accordance with the present invention, a multichannel split SOCKS server can include both a SOCKS client component and a SOCKS server component positioned on either side of a secure data communications network. Specifically, the split SOCKS client can be disposed within a client computing device and can maintain a data communications tunnel with the split SOCKS server within the secure data communications network through which client and server applications can be communicate. In consequence, all IP data processed in the client application which is directed to the server application first can pass through the split SOCKS proxy server configuration.

Figure 1:
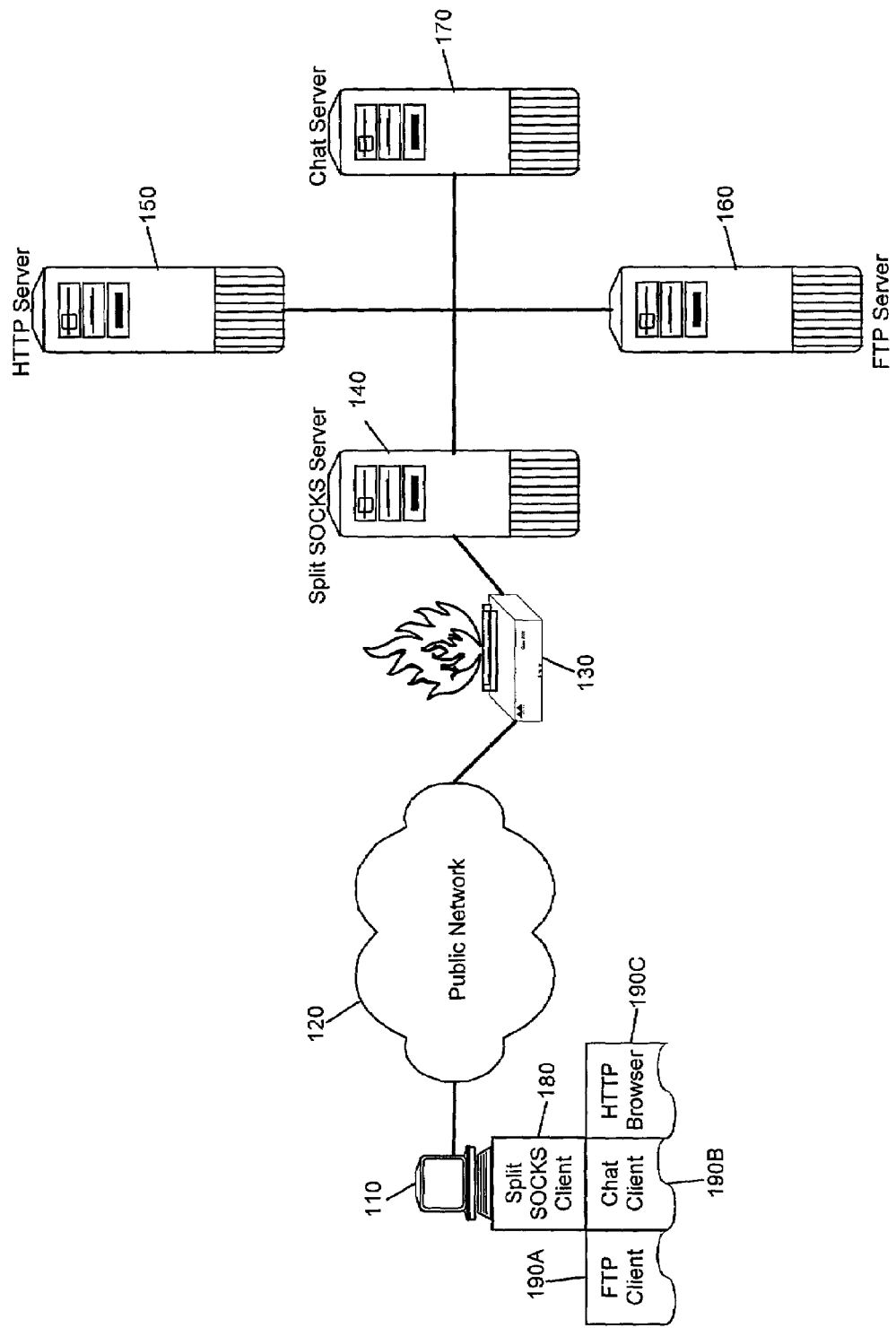
FIG. 1 is a schematic illustration of a data communications network configured with the split SOCKS proxy server of the present invention; and, FIGS. 2A through 2C, collectively, illustrate pervasive device roaming in the data communications network of FIG. 1.

FIG. 1 is a schematic illustration of a data communications network configured with the multichannel split SOCKS proxy server of the present invention. The data communications network can include both private and public portions. The public portion of the data communications network can include one or more client computing devices 110 communicating with the private portion of the data communications network through a publicly accessible network, for example the Internet 120. The private portion of the data communications network can include one or more network application servers 150, 160, 170, for example an HTTP server, an FTP server and a chat server. Notably, the private portion and public portion of the data communications network can remain securely separated by virtue of the placement and configuration of firewall 130. In particular, the properly configured firewall 130 can prohibit direct communications between the client computing device 110 and the network application servers 150, 160, 170.

Importantly, the data communications network of FIG. 1 can be configured with a multichannel split SOCKS proxy server configuration, including both a split SOCKS client 180 and a split SOCKS server 140. The split SOCKS server 140 can be positioned within the private portion of the data communications network. The split SOCKS client 180, by comparison, can be positioned within the client computing device 110. Client applications 190A, 190B, 190C operating within the client computing device 110, for instance an FTP client, a chat client and a Web browser, can access corresponding server applications 150, 160, 170 first through a tunnel formed by a secured data communications link between the split SOCKS client 180 and the split SOCKS server 140.

More particularly, in operation the split SOCKS client 180 can establish an authenticated tunnel with the split SOCKS server 140 through the firewall 130. The authenticated tunnel can be established through a "login" type interface and can employ any one of a number of well-known encryption schemes, although the invention is not limited to the manner in which the authenticated tunnel is established. Moreover, the authenticated tunnel can be established over any type of communications protocol, including TCP, UDP, WiFi, 802.11(a), 802.11(g), Bluetooth, GPRS, etc.

With the authenticated tunnel in place, the client applications 190A, 190B, 190C can be conventionally "socksified" to interact with the split SOCKS client 180. Subsequently, all IP data originating in the client applications 190A, 190B, 190C which are destined for corresponding server applications 190A, 190B, 190C first can pass through the split SOCKS client 180. The split SOCKS client 180 can compress and encrypt the IP data and forward the compressed and encrypted IP data over the authenticated tunnel to the split SOCKS server 140. The split SOCKS server 140 can receive the compressed and encrypted IP data and can decrypt and decompress the received IP data. Finally, the split SOCKS server 140 can forward the decrypted and decompressed data to the target network application 150, 160, 170.

Significantly, not only can the split SOCKS proxy server configuration of the present invention provide for secure access to network applications within the private portion of the data communications network, but also, by multiplexing multiple client server application connections over a single secure connection (the authenticated tunnel), the amount of data flowing between the public and private portions of the data communications network can be dramatically reduced. As one skilled in the art will recognize, low bandwidth considerations are of paramount concern when dealing with pervasive devices communicating in a wireless portion of a data communications network. Specifically, not only can increased packet flow result in slower application performance, but also many wireless packet-based networks charge end-users according to the number of data packets transmitted through the wireless network.

For example, not taking into account data loss considerations, for each TCP connection established in a data communications network, three packets minimally are required. Conversely, for each TCP connection terminated, four packets are required. The typical Web page served by an HTTP server can include multiple elements, the transfer of which from HTTP server to HTTP client can require a single TCP connection. Hence, in the absence of the present invention, loading a single Web page across the data communications network can involve substantial overhead.

Yet, in consequence of the present invention, all connections originating with the HTTP server 150 are terminated in the split SOCKS client 180. The split SOCKS client 180 maintains a single secure connection (the authenticated tunnel) to the split SOCKS server 140 through which the IP data can flow to the private portion of the data communications network. Thus, the overhead associated with the multiple TCP connections can be eliminated.

Additionally, payloads from different network applications 150, 160, 170 can be combined to further reduce the number of IP data packets which would otherwise be required to transmit the IP data between the client applications 190A, 190B, 190C and their corresponding network applications 150, 160, 170. Finally, the IP data can be compressed between the split SOCKS client 180 and split SOCKS server 140 causing yet a further reduction in the consumption of bandwidth across the data communications network.

Importantly, in a preferred aspect of the present invention, for each SOCKS connection request received from the a client application 190A, 190B, 190C, the split SOCKS client 180 can establish a sub-channel over the authenticated tunnel. Notably, as one skilled in the art will recognize, the conventional SOCKS specification permits unique authentication types on each SOCKS connection. Hence, in the preferred aspect of the present invention, if the authentication credentials presented to establish the sub-channel compare to the authentication credentials presented to establish the tunnel, or a previously established sub-channel, the split SOCKS client 180 need not forward the credentials to the split SOCKS server 140, thereby further reducing data sent over the tunnel.

Furthermore, inasmuch as each connection can be mapped over a unique sub-channel, the split SOCKS client 180 and split SOCKS server 140 can utilize protocol specific compression techniques for each sub-channel. For example, a binary transfer of data in association with an FTP application would not be compressed over the sub-channel. In contrast, an ASCII transfer of data in association with an FTP application would be compressed over the sub-channel.

As will be apparent to one skilled in the art, the SOCKS protocol can support both TCP and UDP applications without requiring changes to the application. Such applications can include, for instance, Web browsing, electronic mail, instant messaging, database access, and the like. Still, some client computing devices do not support the SOCKS protocol. In those cases, it remains likely that the client computing device can support HTTP proxying. In the case of a client computing device which can only support HTTP proxying, a split HTTP proxy server configuration can be provided in a manner similar to the split SOCKS proxy server configuration.

Importantly, though the data communications network illustrated in FIG. 1 includes but one firewall 130, merely three network applications 150, 160, 170, and a single client computing device 110 hosting merely three client applications 190A, 190B, 190C, the invention is not so limited. Rather, the particular network configuration illustrated in FIG. 1 is to be interpreted merely as exemplary of a data communications network in which the split SOCKS server of the present invention can be deployed. In fact, any number of firewalls, client applications, network applications and client computing devices can suffice so long as at least one SOCKS client component establishes an authenticated tunnel with at least one SOCKS server component through which one or more client applications in the public portion of the data communications network can communicate with one or more corresponding network applications in the private portion of the data communications network.

Figure 2A:
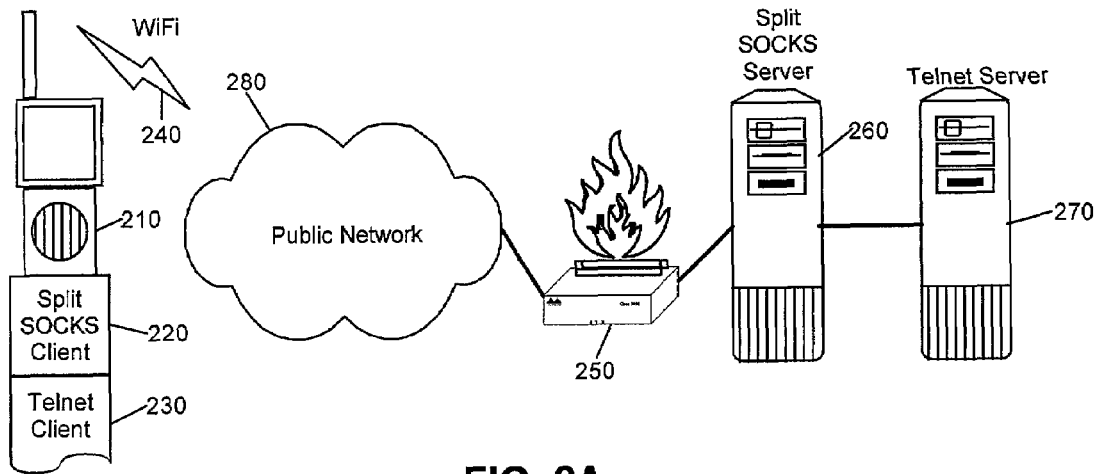

The split SOCKS server configuration of FIG. 1 additionally can support pervasive device roaming in a manner which previously could not be accommodated using a conventional SOCKS proxy server configuration. In that regard, FIGS. 2A through 2C, collectively, illustrate pervasive device roaming in the data communications network of FIG. 1. Beginning in FIG. 2A, a pervasive computing device 210 hosting a telnet client 230 can be configured with a split SOCKS client 220. A corresponding split SOCKS server 260 can be positioned within a private portion of a data communications network in which a telnet server also can be positioned. Of course, the private portion of the data communications network can be configured with a firewall programmed to disallow direct communications with the telnet server 270.

The pervasive computing device 210 can establish a WiFi (802.11(b)) link to the public portion of the data communications network. Subsequently, the split SOCKS client 220 and split SOCKS server 260 can establish an authenticated tunnel through the firewall 250 and the public network 280. Subsequently, a telnet session can be established between the telnet client 230 and the telnet server 270. The IP data packets generated in the course of the telnet session can flow exclusively through the authenticated tunnel.

Figure 2B:
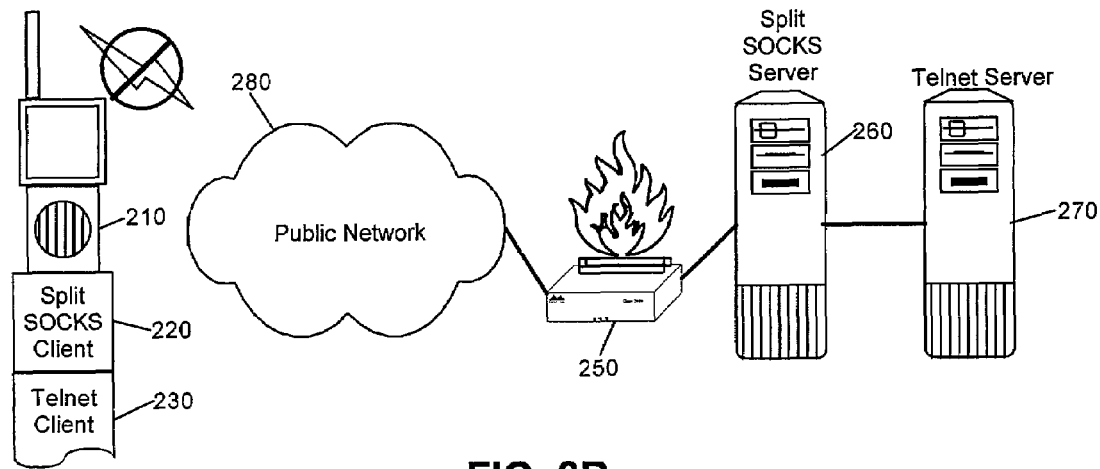
Figure 2C:
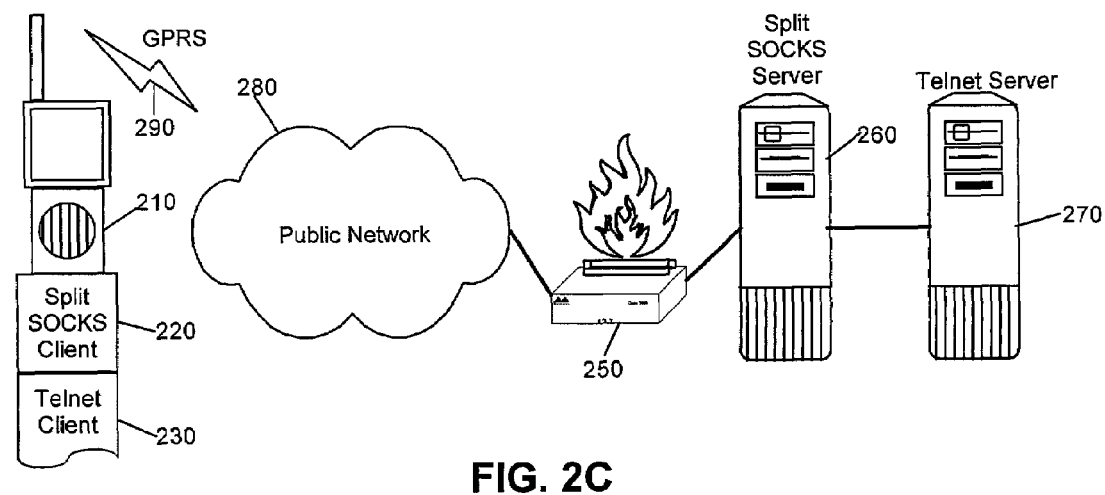

In FIG. 2B, the WiFi data communications link can terminate, perhaps in consequence of the pervasive communications device 210 roaming outside the range of the WiFi-based wireless network. Yet, unlike a conventional telnet session between an internal telnet server and an external client computing device where the lost link would result in the invalidation of the respective IP addresses, in the present case, the telnet client 230 and the telnet server 270 can remain oblivious to the lost link. Rather, only the split SOCKS client 220 and the split SOCKS server 260 can detect the dropped link. In that event, as shown in FIG. 2C, the split SOCKS client 220 and the split SOCKS server 260 can re-establish the authenticated tunnel once the pervasive computing device 210 re-establishes a new wireless link, perhaps a GPRS-based link. In consequence of the establishment of a new authenticated tunnel, the telnet session can continue seamlessly.

Thus, the split SOCKS proxy server can be configured to smoothly handle the unique communications issues associated with pervasive computing, including roaming and bandwidth limitations. In particular, the split SOCKS proxy server configuration can reduce traffic flow between an Internet based client and computing resources within the Intranet. Furthermore, the split SOCKS proxy server configuration can enable seamless roaming between networks designed to support pervasive devices without risking the loss of the underlying data communications link between the Internet based client and computing resources within the Intranet. Finally, the split SOCKS proxy server configuration can support HTTP-based communications.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a data communications network, a split proxy comprising:
   a split proxy server disposed behind a firewall in a private portion of the data communications network;
   a split proxy client disposed in a client computing device positioned externally to said private portion of the data communications network;
   a split proxy client interface to at least one client application in said client computing device, and a split proxy server interface to at least one server application corresponding to said at least one client application in said private portion of the data communications network; and,
   a tunnel established between said split proxy client and split proxy server, said tunnel hosting all Internet Protocol (IP) data traffic between said at least one client application and said at least one corresponding server application in said private portion of the data communications network.

2. The split proxy of claim 1, wherein said split proxy server comprises a split SOCKS server and said split proxy client comprises a split SOCKS client.

3. The split proxy of claim 1, wherein said split proxy server comprises a split HTTP proxy server and said split proxy client comprises a split HITP proxy client.

4. The split proxy of claim 1, wherein each of said split proxy client and split proxy server comprises link re-establishment logic configured to re-establish a link forming said tunnel responsive to a termination of said link.

5. The split proxy of claim 1, wherein said tunnel comprises an authenticated tunnel.

6. The split proxy of claim 1, wherein each of said split proxy client and split proxy server comprises a data compressor/decompressor configured to compress all IP data flowing through said tunnel and to decompress all IP data emerging from said tunnel.

7. The split proxy of claim 1, wherein said tunnel comprises a plurality of sub-channels, each said sub-channel hosting all IP data traffic between a single one of said at least one client application and a corresponding one of said at least one corresponding server application in said private portion of the data communications network.

8. A method for processing secure data communications between a server application disposed in a private portion of a data communications network, and a client application hosted in a client computing device in a portion of the data communications network which is external to the private portion, said method comprising the steps of:
   programming a firewall in the private portion of the data communications network to disallow communicative links between the server application and computing devices which are external to the private portion of the data communications network;
   socksifying the client application;
   configuring the client computing device to host a split SOCKS client;
   forming an authenticated tunnel between said split SOCKS client in the client computing device, and a split SOCKS server disposed in the private portion of the data communications network; and,
   passing application data between the client application and server application over said authenticated tunnel.

9. A multichannel method for processing secure data communications between server applications disposed in a private portion of a data communications network, and socksified client applications hosted in a client computing device in a portion of the data communications network which is external to the private portion, the data communications network having a firewall separating said private and external portions, said firewall having a configuration for disallowing communicative links between the server applications and computing devices in the external portion, said method comprising the steps of:
   establishing a communicative link between a split SOCKS client in the client computing device, and a split SOCKS server disposed in the private portion of the data communications network, said communicative link forming an authenticated tunnel; and,
   establishing a sub-channel over said authenticated tunnel for each pair of client applications and server applications, wherein application data associated with each pair can be passed through said authenticated tunnel over said sub-channel.

10. The method of claim 9, further comprising the steps of:
   inspecting an authentication credential for each additional client application requesting a connection through said split SOCKS server with a corresponding server application; and,
   if said inspected authentication credential compares to an authentication credential already inspected when establishing one of said authenticated tunnel and said sub-channels, establishing a new sub-channel for said additional client application and corresponding server application without forwarding said credential to said split SOCKS server.

11. The method of claim 9, further comprising the steps of:
- detecting a break in said communicative link forming said authenticated tunnel; and,
- responsive to detecting said break, re-establishing a communicative link between said split SOCKS client in the client computing device, and said split SOCKS server disposed in the private portion of the data communications network, said re-established communicative link re-forming said authenticated tunnel, and, passing application data between the client application and server application over said re-formed authenticated tunnel.

12. The method of claim 9, further comprising the steps of:
- compressing said application data prior to passing said application data over said authenticated tunnel; and,
- decompressing said compressed application data subsequent to passing said application data over said authenticated tunnel.

13. A machine readable storage having stored thereon a computer program for processing secure data communications between server applications disposed in a private portion of a data communications network, and socksified client applications hosted in a client computing device in a portion of the data communications network which is external to the private portion, the data communications network having a firewall separating said private and external portions, said firewall having a configuration for disallowing communicative links between the server applications and computing devices in the external portion, said computer program comprising a routine set of instructions for causing the machine to perform the steps of:
- establishing a communicative link between a split SOCKS client in the client computing device, and a split SOCKS server disposed in the private portion of the data communications network, said communicative link forming an authenticated tunnel; and,
- establishing a sub-channel over said authenticated tunnel for each pair of client applications and server applications, wherein application data associated with each pair can be passed through said authenticated tunnel over said sub-channel.

14. The machine readable storage of claim 13, further comprising the steps of:
- inspecting an authentication credential for each additional client application requesting a connection through said split SOCKS server with a corresponding server application; and,
- if said inspected authentication credential compares to an authentication credential already inspected when establishing one of said authenticated tunnel and said sub-channels, establishing a new sub-channel for said additional client application and corresponding server application without forwarding said credential to said split SOCKS server.

15. The machine readable storage of claim 13, further comprising the steps of:
- detecting a break in said communicative link forming said authenticated tunnel; and,
- responsive to detecting said break, re-establishing a communicative link between said split SOCKS client in the client computing device, and said split SOCKS server disposed in the private portion of the data communications network, said re-established communicative link re-forming said authenticated tunnel, and, passing application data between the client application and server application over said re-formed authenticated tunnel.

16. The machine readable storage of claim 13, further comprising the steps of:
- compressing said application data prior to passing said application data over said authenticated tunnel; and,
- decompressing said compressed application data subsequent to passing said application data over said authenticated tunnel.

* * * * *